(12) United States Patent
Mariani et al.

(10) Patent No.: US 7,430,599 B2
(45) Date of Patent: Sep. 30, 2008

(54) METHOD AND SYSTEM FOR CENTRALIZED NETWORK USAGE TRACKING

(75) Inventors: Rico Mariani, Kirkland, WA (US); Lee Wang, Kirkland, WA (US); Madhan Subhas, Kirkland, WA (US); Ramesh Manne, Redmond, WA (US); Tara S. Prakriya, Redmond, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/278,302

(22) Filed: Mar. 31, 2006

(65) Prior Publication Data

US 2006/0179133 A1  Aug. 10, 2006

Related U.S. Application Data

(62) Division of application No. 09/704,196, filed on Oct. 31, 2000, now Pat. No. 7,103,657.

(51) Int. Cl.
*G06F 15/173* (2006.01)

(52) U.S. Cl. ................. 709/224; 709/200; 709/203; 709/223; 709/225; 709/226; 709/238

(58) Field of Classification Search ........... 709/200, 709/203, 223–226, 238
See application file for complete search history.

(56) References Cited

U.S. PATENT DOCUMENTS

| 5,903,625 | A | | 5/1999 | May |
| 5,951,652 | A | * | 9/1999 | Ingrassia et al. ............ 709/248 |
| 6,015,508 | A | | 1/2000 | Ohnishi et al. |
| 6,018,619 | A | | 1/2000 | Allard et al. |
| 6,035,332 | A | * | 3/2000 | Ingrassia et al. ............ 709/224 |
| 6,076,166 | A | | 6/2000 | Moshfeghi et al. |
| 6,119,135 | A | | 9/2000 | Helfman |
| 6,529,952 | B1 | * | 3/2003 | Blumenau ................. 709/223 |
| 6,535,916 | B1 | | 3/2003 | Nguyen |
| 6,538,996 | B1 | | 3/2003 | West et al. |
| 6,734,886 | B1 | * | 5/2004 | Hagan et al. .............. 715/853 |
| 6,789,115 | B1 | | 9/2004 | Singer et al. |
| 6,795,856 | B1 | * | 9/2004 | Bunch ...................... 709/224 |
| 7,020,622 | B1 | * | 3/2006 | Messer ..................... 705/26 |
| 2001/0011365 | A1 | | 8/2001 | Helfman |

* cited by examiner

*Primary Examiner*—Liangche A Wang
(74) *Attorney, Agent, or Firm*—Lee & Hayes, PLLC

(57) ABSTRACT

In accordance with a method and system for centralized network usage tracking, documents on a network server include a reference to content on a centralized logging server. When one of the documents is accessed by a client computer, the process of rendering the content at the client computer includes requesting the content from the logging server. The logging server, upon receipt of such a request, logs information embedded in the request and returns a trivial response which requires little time and which rendering of need not be perceivable by the user.

18 Claims, 5 Drawing Sheets

150

152 {
<HTML>
<HEAD>
<META HTTP-EQUIV="Content-Type" CONTENT="text/html; charset=iso8859-1" />
<TITLE>Welcome to Microsoft's Homepage</TITLE>
.
.
.
</HEAD>

154 {
<BODY BGCOLOR="#FFFFFF" TOPMARGIN="0" LEFTMARGIN="0" MARGINWIDTH="0" MARGINHEIGHT="0" TEXT="#000000" ALINK="#003399" LINK="#003399" VLINK="#003399">
.
.
.
</BODY>

156 → <IMG SRC="http://c.msn.com/c.dll?02.38.29.57">
</HTML>

```
BYTE g_abInvisiGif[] =
{
0x47, 0x49, 0x46, 0x38, 0x39, 0x61, 0x01, 0x00,
0x01, 0x00, 0x91, 0xff, 0x00, 0xff, 0xff, 0xff,
0x00, 0x00, 0x00, 0xc0, 0xc0, 0xc0, 0x00, 0x00,
0x00, 0x21, 0xf9, 0x04, 0x01, 0x00, 0x00, 0x02,
0x00, 0x2c, 0x00, 0x00, 0x00, 0x00, 0x01, 0x00,
0x01, 0x00, 0x00, 0x02, 0x02, 0x54, 0x01, 0x00,
0x3b
};
```

Fig. 4

METHOD AND SYSTEM FOR CENTRALIZED NETWORK USAGE TRACKING

RELATED APPLICATIONS

This application is a divisional of a copending U.S. application Ser. No. 09/704,196, filed Oct. 31, 2000.

TECHNICAL FIELD

This invention relates to networks and information logging, and more particularly to a method and system for centralized network usage tracking.

BACKGROUND OF THE INVENTION

Computer systems throughout the world are becoming increasingly connected via the Internet and the World Wide Web. The World Wide Web (also referred to as simply the "Web") is a collection of documents (commonly referred to as "Web pages") that users can view or otherwise render and which typically include links to one or more other pages that the user can access. Web pages are hosted on a web server that is accessible to client devices via the Internet and can provide a wide range of information, such as company or personal information, product information, interactive information allowing purchases of goods or services to be made, etc.

Businesses and individuals often find it beneficial to be able to track the manner in which users use the web (e.g., what web pages are being viewed by users). Such tracking allows businesses to identify user needs and behaviors, and better provide the users with the information they desire. When companies (which may include multiple different divisions, subsidiaries, etc.) have a larger number of web servers it is beneficial for the information logged at the individual servers to be compiled into a large, centralized log. However, such compilation can prove to be troublesome at best.

Currently it can be very difficult to compile information from a large number of web servers because each web server must perform its own logging of usage, those individual logs must be accessed, and the necessary information retrieved from the logs. Given that web servers can host a large number of web pages, a very large amount of information can be logged by the individual servers (e.g., on the order of hundreds of thousands or more user accesses per day). Current technology makes it difficult and time consuming to compile such large amounts of individually collected information into a centralized location. Attempts to compile such information in a centralized log are only exacerbated by the fact that web servers can be spread across a wide geographic range (e.g., world-wide), different web servers may store different information in their individual logs, different web servers may store information in different formats, etc. Thus, it would be beneficial to provide an improved mechanism for tracking web usage across a large number of web servers.

The invention described below addresses these disadvantages, providing for centralized network usage tracking.

SUMMARY OF THE INVENTION

A method and system for centralized network usage tracking is described herein.

According to one aspect, documents on a network server include a reference to content on a centralized logging server. When one of the documents is accessed by a client computer, the process of rendering the content at the client computer includes requesting the content from the logging server. The logging server, upon receipt of such a request, logs information embedded in the request and returns a trivial response which requires little time and which rendering of need not be perceivable by the user.

According to another aspect, the logging server responds to requests with a small, trivial response. In one exemplary implementation, the trivial response totals only 49 bytes and is a one pixel by one pixel transparent graphic image (which therefore will not affect the appearance of the rest of the web page when rendered).

BRIEF DESCRIPTION OF THE DRAWINGS

The present invention is illustrated by way of example and not limitation in the figures of the accompanying drawings. The same numbers are used throughout the figures to reference like components and/or features.

FIG. 3 illustrates an exemplary web page including a tracking tag in accordance with certain embodiments of the invention.

FIG. 4 illustrates an exemplary trivial response.

DETAILED DESCRIPTION

Figure 1:
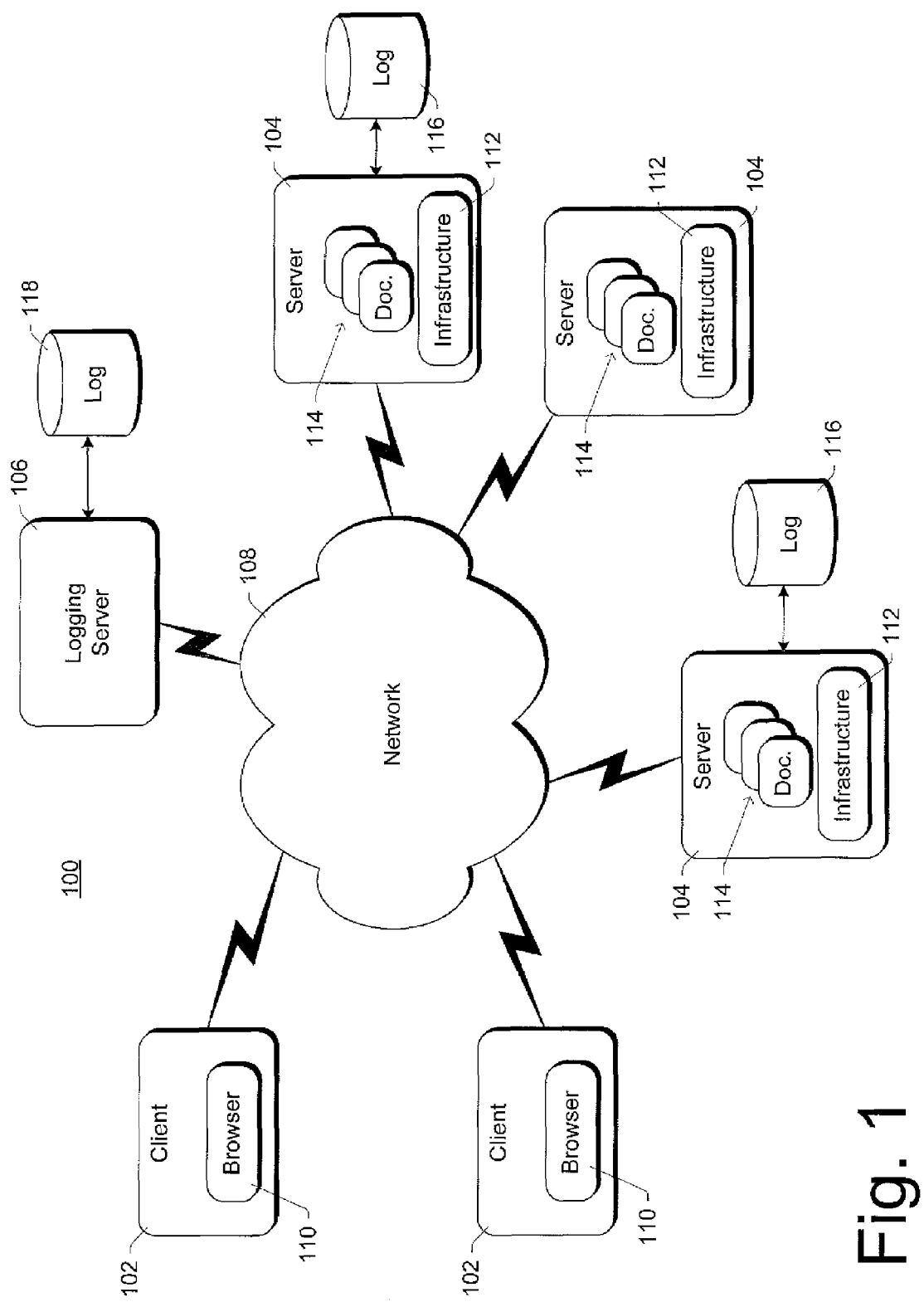
FIG. 1 is a block diagram illustrating an exemplary network environment such as may be used in accordance with certain embodiments of the invention.

FIG. 1 is a block diagram illustrating an exemplary network environment such as may be used in accordance with certain embodiments of the invention. In the network environment 100 of FIG. 1, multiple clients 102, multiple servers 104, and a logging server 106 are illustrated coupled together via a network 108. Network 108 represents any of a wide variety of wired and/or wireless networks, including public and/or private networks (such as the Internet, local area networks (LANs), wide area networks (WANs), etc.). Clients 102 and servers 104, 106 can be coupled to network 108 in any of a wide variety of conventional manners, such as wired or wireless modems, direct network connections, etc.

Clients 102 communicate with servers 104, 106 using one or more protocols. In one implementation, network 108 is the Internet which supports the World Wide Web, and each client 102 includes a web browser 110 that allows users of clients 102 to access information on the Web. Information is communicated among clients 102 and servers 104, 106 using, for example, the well-known Hypertext Transfer Protocol (HTTP), although other protocols (either public or proprietary) could alternatively be used. Web pages are created in a markup language, such as Hypertext Markup Language (HTML) or eXtensible Markup Language (XML), although other languages could alternatively be used.

Each server 104 includes an infrastructure 112 that can vary on a per-server basis as well as one or more documents 114. Documents 114 refer to files (or portions thereof), such as web pages, that are accessible to one or more clients 102. The infrastructure 112 can include, for example, a web server application that manages the accessing of the documents 114 by clients 102, a logging application or process that allows information regarding users to be logged locally (e.g., in local logs 116), etc. It should be noted, however, that this local logging is distinct from the centralized logging as discussed in more detail below.

The format of documents 114 can vary depending on the protocol(s) supported by the network. By way of example, network 108 may be the Internet, servers 104 web servers, and documents 114 written in HTML or XML. A document 114 can optionally include references to content that is to be retrieved from different sources. For example, a browser 110 accessing a document 114 may, upon rendering the document, obtain content from additional sources (such as different documents 114 on the same server, or content on another server, content cached locally at client 102, etc.). During operation, browser 110 can render the content as it is received, or alternatively wait until all the content has been received from the various sources prior to rendering the content.

One or more documents 114 include a reference to content on logging server 106, which causes a browser 110 rendering the content of the document 114 to access logging server 106. When logging server 106 is accessed to obtain the content, the access is logged by logging server 106 in log 118. Thus, accesses to documents 114 on servers 104 result in additional accesses being made to logging server 106, thereby allowing the accesses to servers 104 to be logged in a centralized location (log 118). Although each document 114 need not include a reference to content on logging server 106, documents which do not include the reference are not logged by logging server 106.

Although the discussions herein refer to a single logging server 106, alternatively multiple logging servers 106 may exist that operate together to perform the centralized logging. For example, multiple logging servers may store the logged data into the same log 118.

Figure 2:
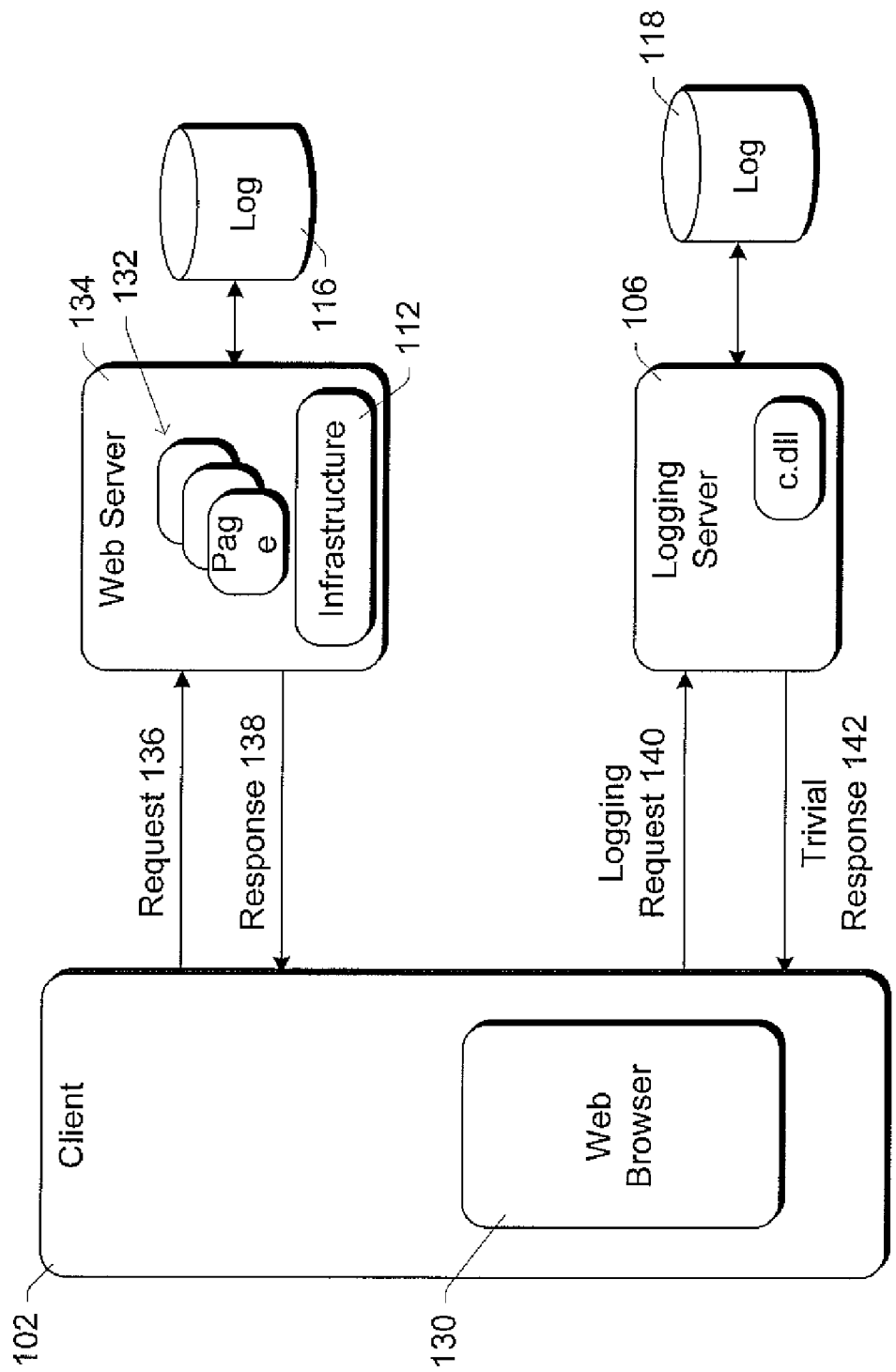
FIG. 2 is a block diagram illustrating the exemplary data flow in logging network usage at a centralized log server in accordance with certain embodiments of the invention.

FIG. 2 is a block diagram illustrating the exemplary data flow in logging network usage at a centralized log server in accordance with certain embodiments of the invention. The example of FIG. 2 is discussed with reference to a user accessing web pages on a web server via a web browser on client 102. In the example of FIG. 2, a user (or alternatively another program) of client 102 requests access to one of web pages 132 on web server 104 via web browser 130. This request can be submitted in any of a wide variety of conventional manners, such as the user manually entering an address (e.g., Internet address, uniform resource locator (URL), etc.), the selecting a link in another web page, etc. The request is carried out by web browser 130 sending a request 136 to server 134. Web server 134 responds to request 136 by sending, as a response 138, the requested web page 132. Web server 134 also stores, in local log 116, information regarding the user's access of web server 134. This local storage allows the owner or administrator of web server 134 to log accesses locally and separately from the centralized logging.

The requested web page 132 includes an additional tag to content stored on logging server 106, referred to as a tracking tag. When rendering web page 132, web browser 130 encounters this tracking tag and accesses logging server 106 by sending a logging request 140 to logging server 106 for the content. Receipt of request 140 gives logging server 106 the information it needs to store information regarding the user's access of the web page 132 on web server 104. In response to logging request 140 an application executing on logging server 106 (c.dll in the illustrated example) logs information regarding the user's access of the web page 132 in log 118, and returns a trivial response 142 to web browser 130. Trivial response 142 is a small response that is designed to have little or no impact on the display of the requested web page 132 by web browser 130.

In one implementation, the tracking tag included in the web pages 132 is as follows:

<IMG SRC="http://c.msn.com/c.dll?parameters">

The c.msn.com is the reference to logging server 106 (that is, it is an identifier that corresponds to the Internet address of logging server 106) and c.dll is the name of the program on logging server 106 that performs the logging. It is to be appreciated that the reference to the logging server and the name of the program on the logging server that performs the logging will vary by implementation based on the actual names or identifiers assigned in the specific implementation. The parameters are logging information that is recorded by the web server 134 and passed to web browser 130 along with the response 138. These parameters may be implemented in different formats, such as a simple list of the information to be logged, an encoded and/or encrypted version of the information to be logged, etc.

A wide variety of information regarding usage of the web by the user can be included in the parameters of the tracking tag. In one exemplary implementation, the following information is encoded as the parameters of the tag: the subject matter of the content of the web page (e.g., soccer, sport fishing, consumer audio/video electronics, etc.); an identification (e.g., address) of the web server hosting the web page; what actions were being taken by the user when the web page was displayed (e.g., regular viewing, filling in a form, taking a poll, etc.); and what kind of advertising, if any, was being displayed to the user (e.g., the subject matter of the advertisements, specific companies/products/services being advertised, etc.). All of this information is readily available to web server 134 and can be dynamically incorporated into the requested web pages as the parameters of the tracking tag in a conventional manner.

Other information may also be sent by web browser 130 as logging request 140 in addition to that included as the parameters to the tracking tag discussed above. In one implementation, a user of client 102 has a set of data that corresponds to him or her and describes his or her various attributes (e.g., name, usage patterns, preferences, etc.) that is stored at client 102 by a server (such as server 134). This set of data is commonly referred to as a "cookie". The cookie has a range of addresses or URLs that it is associated with, which can include the logging server 106. Each time that web browser 130 accesses content on a server that is included in the range associated with the cookie, that cookie is sent by web browser 130 to that server. If the logging server 106 is within the range of addresses associated with the cookie, then the cookie is also sent by web browser 130 as part of logging request 140, allowing logging server 106 to store the cookie (or selected information from the cookie) in log 118. In one implementation, the logging server 106 and web server 134 are associated with the same domain (the same range of addresses), so the same cookie is associated with both servers 106 and 134. It should be noted that this use of cookies is an overt sharing of information between servers, and thus can be readily audited by individuals with privacy concerns, suppressed by the user, etc.

The tracking tag can be incorporated into web pages 132 in a variety of different locations (and can vary per web page). In one implementation, the tag is located at the end of the page outside of the formatting of the page. By placing the tag outside of the formatting, user-perceivable delay in rendering the page due to accessing the additional content can be avoided. For example, some browsers may need to know the size of all additional content that is referenced within the formatting portion of the web page, and such browsers access the servers that store that content for such sizes prior to rendering the web page. Thus, by placing the tag outside of the formatting, the logging server 106 is not accessed by the browser until after the rest of the page has been rendered (so no additional delay is imposed on the rendering of the web page by accessing the logging server, nor are users adversely affected if the logging server should happen to be unavailable).

FIG. 3 illustrates an exemplary web page including a tracking tag in accordance with certain embodiments of the invention. In the illustrated example, a web page 150 is written in HTML and includes a header portion 152 and a body portion 154. Outside of these portions 152 and 154 is a reference portion 156 that includes a tracking tag having parameters 158 (four pieces of information each encoded into a two-digit number).

Returning to FIG. 2, logging server 106 performs its logging of data based on logging request 140. In the illustrated example, trivial response 142 simply serves to be a response to logging request 140. Some protocols (such as HTTP) call for a response to be returned for each request—failure to return such a response can result in different actions, such as another request by browser 130, an error being displayed to the user that the requested content or address could not be found, etc. By returning the trivial response, logging server 106 avoids inefficiencies due to additional repeated requests, notifications to the user, etc. Alternatively, if such inefficiencies can be tolerated (or if the protocol being used does not require a response to requests) then logging server 106 need not return any response.

The trivial response returned by logging server 106 can be any of a wide variety of responses, and in one implementation is designed so that rendering of the content included in the response is not perceivable by a user. By way of example, the trivial response may be a single pixel that is transparent (so that when displayed the pixel would not be visible to the user), or the trivial response may be a single musical note with a very low or muted volume (so that when the note is played it would not be heard by the user). Other types of trivial responses may also be used.

In the illustrated example, the trivial response returned by logging server 106 is designed to be very small so that the performance impact on the browser of having to obtain the content from logging server 106 is reduced. In one implementation, trivial response 142 is only 49 bytes. By having a small trivial response, the performance of logging server 106 is also improved, allowing server 106 to respond to a very large number of requests in a timely manner. An exemplary 49-byte trivial response is illustrated in FIG. 4.

Figure 5:
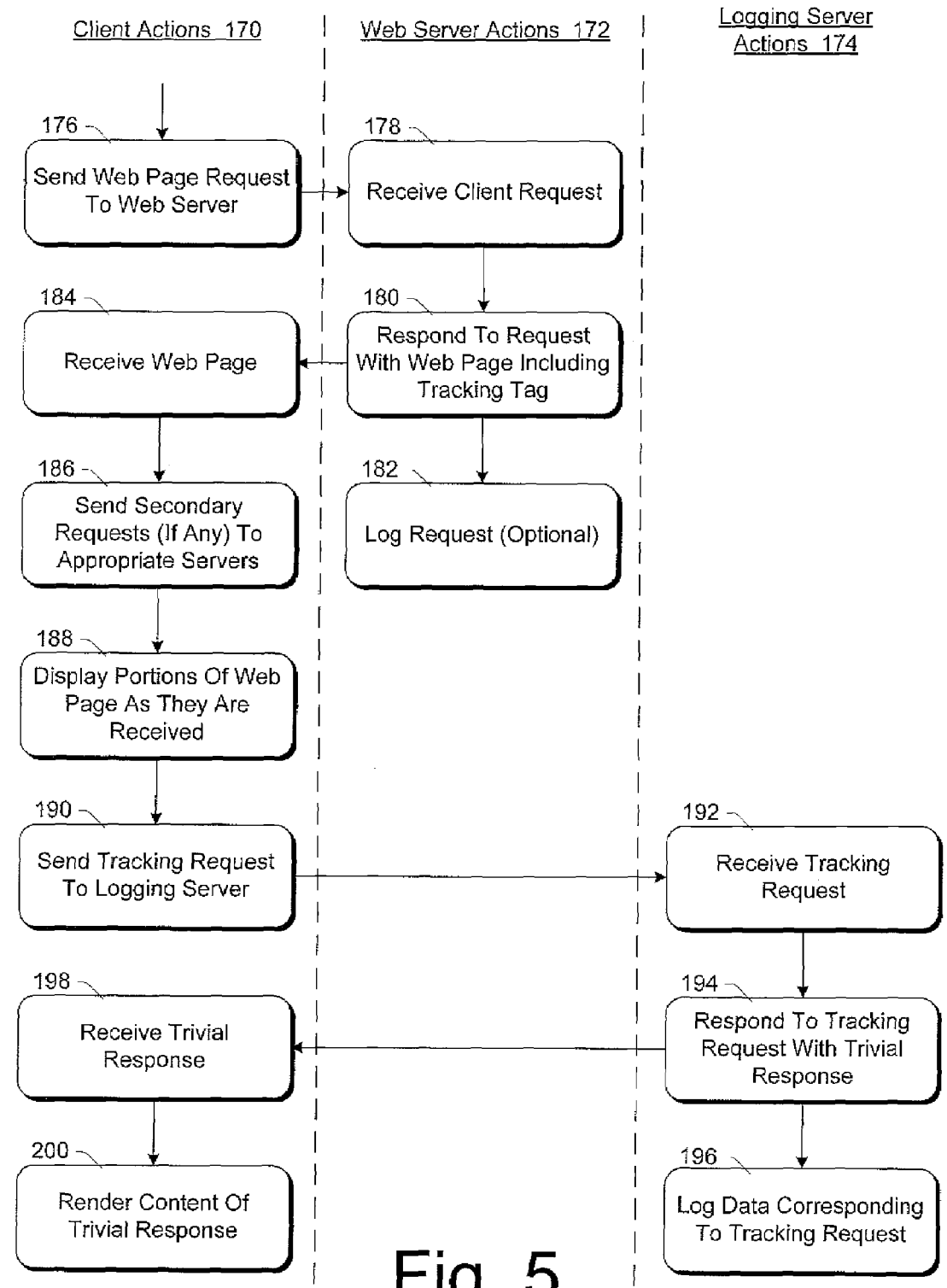
FIG. 5 is a flowchart illustrating an exemplary process for centrally logging server accesses in accordance with certain embodiments of the invention.

FIG. 5 is a flowchart illustrating an exemplary process for centrally logging server accesses in accordance with certain embodiments of the invention. In the illustrated example of FIG. 5, the process is described with reference to accessing a web page from a web server. The process of FIG. 5 illustrates the actions taken by a client web browser (portion 170), a web server (portion 172), and a logging server (portion 174). These actions can be implemented in software, firmware, hardware, or a combination thereof, and can be implemented in different manners by the client and servers.

Initially, a request for a web page is sent from the client web browser to the web server (act 176). The web server receives the request (act 178) and responds with the requested web page including the additional tracking tag (act 180). The web server also optionally logs information regarding the user (and/or information about what the user was doing, viewing, etc.) locally (act 182).

The requested web page is received by the web browser (act 184), which in turn sends out any necessary secondary requests to the appropriate servers (act 186). These secondary requests are to receive other content needed to display the requested web page (which may be hosted on the same or different servers as the requested web page). Web browser 180 renders (e.g., displays visual content, plays audio content, etc.) portions of the web page as they are received (act 188), and once all portions are rendered sends a tracking request to the logging server (act 190). The logging server receives the tracking request (act 192) and responds to the tracking request with a trivial response (act 194). The logging server also logs data included in and/or corresponding to the tracking request (act 196), such as information embedded in the request, cookies associated with the request, etc. The web browser receives the trivial response (act 198) and renders the content of the trivial response (act 200).

Figure 6:
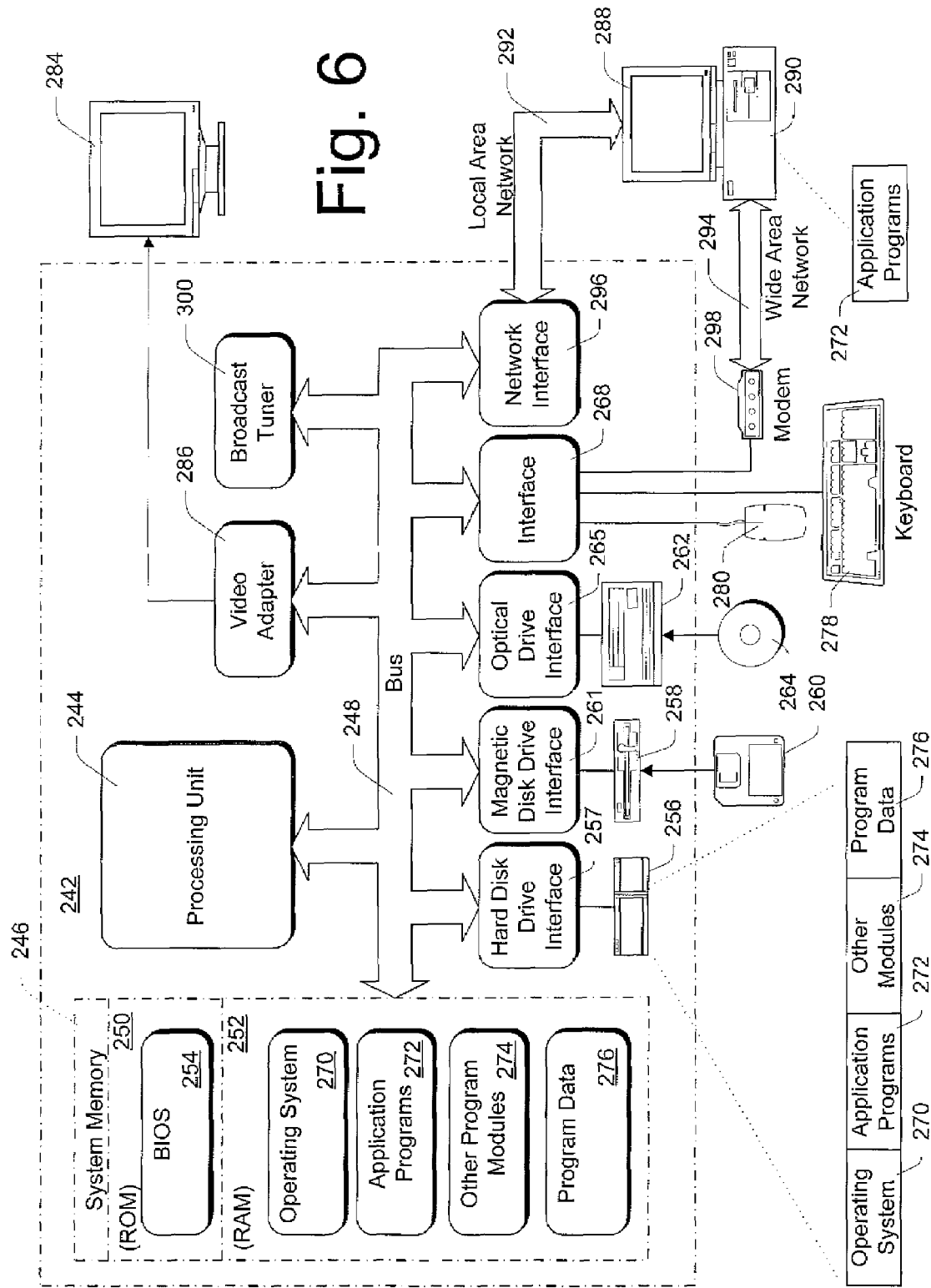
FIG. 6 illustrates an example of a suitable operating environment in which at least portions of the invention may be implemented.

FIG. 6 illustrates an example of a suitable operating environment in which at least portions of the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, public terminals or kiosks, wearable computers, network PCs, minicomputers, mainframe computers, distributed computing environments that include any of the above systems or devices, and the like.

FIG. 6 shows a general example of a computer 242 that can be used in accordance with the invention. Computer 242 is shown as an example of a s computer that can perform the functions of a client 102 or server 104, 106, or 134 of FIGS. 1 or 2. Computer 242 includes one or more processors or processing units 244, a system memory 246, and a bus 248 that couples various system components including the system memory 246 to processors 244.

The bus 248 represents one or more of any of several types of bus structures, including a memory bus or memory controller, a peripheral bus, an accelerated graphics port, and a processor or local bus using any of a variety of bus architectures. The system memory 246 includes read only memory (ROM) 250 and random access memory (RAM) 252. A basic input/output system (BIOS) 254, containing the basic routines that help to transfer information between elements within computer 242, such as during start-up, is stored in ROM 250. Computer 242 further includes a hard disk drive 256 for reading from and writing to a hard disk, not shown, connected to bus 248 via a hard disk drive interface 257 (e.g., a SCSI, ATA, or other type of interface); a magnetic disk drive 258 for reading from and writing to a removable magnetic disk 260, connected to bus 248 via a magnetic disk drive interface 261; and an optical disk drive 262 for reading from and/or writing to a removable optical disk 264 such as a CD ROM, DVD, or other optical media, connected to bus 248 via an optical drive interface 265. The drives and their associated computer-readable media provide nonvolatile storage of computer readable instructions, data structures, program modules and other data for computer 242. Although the exemplary environment described herein employs a hard disk, a removable magnetic disk 260 and a removable optical disk 264, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 260, optical disk 264, ROM 250, or RAM 252, including an operating system 270, one or more application programs 272, other program modules 274, and program data 276. A user may enter commands and information into computer 242 through input devices such as keyboard 278 and pointing device 280. Other input devices (not shown) may include a microphone, joystick, game pad, satellite dish, scanner, or the like. These and other input devices are connected to the processing unit 244 through an interface 268 that is coupled to the system bus (e.g., a serial port interface, a parallel port interface, a universal serial bus (USB) interface, etc.). A monitor 284 or other type of display device is also connected to the system bus 248 via an interface, such as a video adapter 286. In addition to the monitor, personal computers typically include other peripheral output devices (not shown) such as speakers and printers.

Computer 242 operates in a networked environment using logical connections to one or more remote computers, such as a remote computer 288. The remote computer 288 may be another personal computer, a server, a router, a network PC, a peer device or other common network node, and typically includes many or all of the elements described above relative to computer 242, although only a memory storage device 290 has been illustrated in FIG. 6. The logical connections depicted in FIG. 6 include a local area network (LAN) 292 and a wide area network (WAN) 294. Such networking environments are commonplace in offices, enterprise-wide computer networks, intranets, and the Internet. In certain embodiments of the invention, computer 242 executes an Internet Web browser program (which may optionally be integrated into the operating system 270) such as the "Internet Explorer" Web browser manufactured and distributed by Microsoft Corporation of Redmond, Wash.

When used in a LAN networking environment, computer 242 is connected to the local network 292 through a network interface or adapter 296. When used in a WAN networking environment, computer 242 typically includes a modem 298 or other means for establishing communications over the wide area network 294, such as the Internet. The modem 298, which may be internal or external, is connected to the system bus 248 via a serial port interface 268. In a networked environment, program modules depicted relative to the personal computer 242, or portions thereof, may be stored in the remote memory storage device. It will be appreciated that the network connections shown are exemplary and other means of establishing a communications link between the computers may be used.

Computer 242 also includes a broadcast tuner 300. Broadcast tuner 300 receives broadcast signals either directly (e.g., analog or digital cable transmissions fed directly into tuner 300) or via a reception device (e.g., via an antenna or satellite dish).

Computer 242 typically includes at least some form of computer readable media. Computer readable media can be any available media that can be accessed by computer 242. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 242. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method for centralized network usage tracking, comprising:
  configuring a web page to include a tracking tag, wherein the tracking tag comprises a referral to content stored on a logging server and includes information about transmission of the web page from a web server to a client;
  accessing, by the client, the webpage including the tracking tag;
  transmitting the web page accessed including the tracking tag from the web server to the client;
  rendering the transmitted web page on the client, wherein the rendering of the transmitted web page comprises sending a request by the client to the logging server for delivery of the content identified by the tracking tag;
  receiving, at the logging server, the request for delivery of the content from the client;
  logging the information included within the tracking tag at the logging server; and
  sending a trivial response as the content identified by the tracking tag in a resource sent from the logging server to the client, wherein the trivial response is configured to minimize resource expenditures by the client in rendering the trivial response as part of the web page.

2. The method of claim 1, wherein the tracking tag additionally comprises:
   identification of the web server from which the web page was transmitted.

3. The method of claim 1, wherein configuring the web page to include the tracking tag comprises:
   locating the tracking tag at the end of the web page following head and body formatting of the web page.

4. The method of claim 1, wherein logging the information included with the tracking tag is performed by the logging server for a plurality of said tracking tags sent with a plurality of said web pages delivered by a plurality of web servers to a plurality of clients.

5. The method of claim 1, wherein the rendering additionally comprises:
   displaying portions of the web page at the client;
   receiving the trivial response from the logging server in response to the request for delivery of the content; and
   rendering the trivial response with the web page at the client.

6. The method of claim 1, wherein the information about transmission of the web page comprises web usage by the client, including at least one of:
   subject matter of the web page content,
   actions taken by the client when the web page is displayed,
   types of advertisements displayed to the client on the web page,
   the subject matter of the advertisements, or
   a specific company or product promoted in the advertisements.

7. The method of claim 1, further comprising a step of
   storing by the web server in a local log the information about the transmission of the web page to the client, whereby accesses to the web server are logged locally and separately from the logging server.

8. The method of claim 1, further comprising a step of
   encoding or encrypting the information about the transmission of the web page to the client when passing the information to the client with the tracking tag.

9. The method of claim 1, further comprising a step of
   sending a cookie by the client with the request for delivery of the content sent to the logging computer.

10. A method for centralized network usage tracking, comprising:
    providing a logging server for collecting information about accesses by one or more clients to a plurality of web pages on one or more web servers;
    configuring the plurality of web pages to each include a tracking tag, wherein the tracking tag comprises a reference to retrieve content stored on the logging server and includes the information about the accesses by the one or more clients to the web page including the tracking tag on one of said one or more web servers;
    accessing, by a first one of the clients, a first one of the web pages including a first said tracking tag on a first one of the web servers;
    transmitting the first web page including the first tracking tag from the first web server to the first client;
    rendering the transmitted first web page on the first client, wherein the rendering of the transmitted first web page comprises sending a request by the first client to the logging server for delivery of the content identified by the first tracking tag;
    receiving, at the logging server, the request for delivery of the content from the first client;
    logging the information included within the first tracking tag at the logging server; and
    sending a trivial response as the content identified by the tracking tag in a response sent from the logging server to the client, wherein the trivial response is configured to minimize resource expenditures by the first client in rendering the trivial response as part of the web page.

11. The method of claim 10, wherein the first tracking tag additionally comprises:
    identification of the first web server from which the first web page was transmitted.

12. The method of claim 10, wherein configuring the one or more web pages to include the tracking tags comprises:
    locating the tracking tags at the end of the web pages following head and body formatting of the web pages.

13. The method of claim 10, wherein logging the information included with a plurality of the tracking tag is performed by the logging server for the plurality of tracking tags sent with the plurality of web pages delivered by a plurality of the web servers to a plurality of the clients.

14. The method of claim 10, wherein the rendering additionally comprises:
    displaying portions of the first web page at the first client;
    receiving the trivial response from the logging server in response to the request for delivery of the content; and
    rendering the trivial response with the first web page at the first client.

15. The method of claim 10, wherein the information about the access by the first client to the first web page comprises web usage by the first client, including at least one of:
    subject matter of the first web page content,
    actions taken by the first client when the first web page is displayed,
    types of advertisements displayed to the first client on the first web page,
    the subject matter of the advertisements, or
    a specific company or product promoted in the advertisements.

16. The method of claim 10, further comprising a step of
    storing by the first web server in a local log the information about the access by the first client to the first web page, whereby accesses to the first web server are logged locally and separately from the logging server.

17. The method of claim 10, further comprising a step of
    encoding or encrypting the information about the access by the first client to the first web page when passing the information to the first client with the first tracking tag.

18. A method for centralized network usage tracking, comprising:
    providing a logging server for collecting information about accesses by one or more client computers to a plurality of web pages on a plurality of web servers storing the plurality of web pages;
    configuring the plurality of web pages to include tracking tags, wherein each of the tracking tags comprises a reference for accessing content stored on a logging server when rendering the web page including the tracking tag, and each of the tracking tags further includes information about an access by one of said client computers to the web page having the tracking tag;
    accessing, by the client computers, the plurality of web pages on the web servers storing the web pages;

transmitting, to the client computers from the web servers, the web pages accessed including the tracking tags;

rendering each web page transmitted to each client computer, wherein the rendering of each transmitted web page on each client computer comprises sending a request by the client computer to the logging server for delivery of the content stored on the logging server identified by the reference in the tracking tag for the web page;

receiving, at the logging server from the client computers, the requests for delivery of the content corresponding to the tracking tags for each of the plurality of web pages accessed;

logging, at the logging server, the information about the accesses included within the tracking; and sending a trivial response as the content identified by the tracking tag in a response sent from the logging server to the client, wherein the trivial response is configured to minimize resource expenditures by the client in rendering the trivial response as part of the web page.

* * * * *